(12) United States Patent
Oesterling et al.

(10) Patent No.: US 8,494,447 B2
(45) Date of Patent: Jul. 23, 2013

(54) AFTERMARKET TELEMATICS UNIT FOR USE WITH A VEHICLE

(75) Inventors: Christopher L. Oesterling, Troy, MI (US); Daryl L. Carr, Canton, MI (US); Jeffrey P. Christensen, Clinton Township, MI (US); Michael D. Solomon, Novi, MI (US)

(73) Assignee: General Motors LLC, Detroit, MI (US)

( * ) Notice: Subject to any disclaimer, the term of this patent is extended or adjusted under 35 U.S.C. 154(b) by 413 days.

(21) Appl. No.: 12/845,848

(22) Filed: Jul. 29, 2010

(65) Prior Publication Data

US 2012/0028580 A1    Feb. 2, 2012

(51) Int. Cl.
*H04B 7/00* (2006.01)

(52) U.S. Cl.
USPC ............ 455/41.2; 455/575.1; 455/569.2; 455/90.3; 340/815

(58) Field of Classification Search
USPC .......... 455/41.2, 575.1, 569.2, 90.3, 575.9; 340/815.4, 425.5; 381/56, 86, 169, 361
See application file for complete search history.

(56) References Cited

U.S. PATENT DOCUMENTS

| | | | |
|---|---|---|---|
| 4,882,565 A | 11/1989 | Gallmeyer | |
| 5,798,688 A | 8/1998 | Schofield | |
| 6,019,475 A | 2/2000 | Lynam et al. | |
| 6,087,953 A | 7/2000 | DeLine et al. | |
| 6,172,613 B1 | 1/2001 | DeLine et al. | |
| 6,329,925 B1 | 12/2001 | Skiver et al. | |
| 6,366,213 B2 | 4/2002 | DeLine et al. | |
| 6,428,172 B1 | 8/2002 | Hutzel et al. | |
| 6,501,387 B2 | 12/2002 | Skiver et al. | |
| 6,505,100 B1 | 1/2003 | Stuempfle et al. | |
| 6,520,667 B1 | 2/2003 | Mousseau | |
| 6,549,793 B1 | 4/2003 | Baratono | |
| 6,654,669 B2 * | 11/2003 | Eisenmann et al. | 701/1 |
| 6,690,268 B2 * | 2/2004 | Schofield et al. | 340/438 |
| 6,756,912 B2 | 6/2004 | Skiver et al. | |
| 6,889,064 B2 | 5/2005 | Baratono et al. | |
| 6,902,284 B2 * | 6/2005 | Hutzel et al. | 359/865 |
| 6,906,632 B2 * | 6/2005 | DeLine et al. | 340/815.4 |
| 6,993,351 B2 | 1/2006 | Fraser et al. | |
| 7,012,727 B2 | 3/2006 | Hutzel et al. | |
| 7,075,511 B1 | 7/2006 | Mousseau et al. | |
| 7,142,810 B2 | 11/2006 | Oesterling | |
| 7,171,187 B2 | 1/2007 | Haave et al. | |
| 7,171,226 B2 | 1/2007 | Crocker et al. | |

(Continued)

OTHER PUBLICATIONS

Videtich, M.C., et al. "Vehicle Mirror and Telematics System," U.S. Appl. No. 12/851,025, filed Aug. 5, 2010.

(Continued)

*Primary Examiner* — Minh D Dao
(74) *Attorney, Agent, or Firm* — Ingrassia Fisher & Lorenz, P.C.

(57) ABSTRACT

An aftermarket telematics unit for use with a vehicle includes, but is not limited to, a housing that is configured for mounting in an interior of a vehicle, a receiver mounted within the housing and configured to receive a first short range wireless signal at a first frequency, a fob component mounted within the housing and configured to transmit a second short range wireless signal at a second frequency, and a controller mounted within the housing and coupled to the wireless receiver and the fob component. The controller is configured to provide instructions to the fob component to transmit the second short range wireless signal when the wireless receiver receives the first short range wireless signal.

19 Claims, 4 Drawing Sheets

U.S. PATENT DOCUMENTS

| | | | |
|---|---|---|---|
| 7,257,426 B1* | 8/2007 | Witkowski et al. | 455/569.2 |
| 7,293,888 B2* | 11/2007 | Hutzel et al. | 359/871 |
| 7,299,076 B2 | 11/2007 | Dunn, Jr. et al. | |
| 7,308,341 B2 | 12/2007 | Schofield et al. | |
| 7,346,374 B2* | 3/2008 | Witkowski et al. | 455/569.2 |
| 7,349,722 B2* | 3/2008 | Witkowski et al. | 455/569.2 |
| 7,372,818 B2 | 5/2008 | Fraser et al. | |
| 7,395,096 B2 | 7/2008 | Baratono et al. | |
| 7,474,942 B2 | 1/2009 | Patenaude | |
| 7,488,080 B2 | 2/2009 | Skiver et al. | |
| 7,526,367 B2 | 4/2009 | Schofield et al. | |
| 7,651,228 B2 | 1/2010 | Skiver et al. | |
| 7,657,052 B2 | 2/2010 | Larson et al. | |
| 7,690,824 B2 | 4/2010 | Uken et al. | |
| 7,711,479 B2 | 5/2010 | Taylor et al. | |
| 7,734,392 B2 | 6/2010 | Schofield et al. | |
| 7,904,023 B2 | 3/2011 | Viitamäki et al. | |
| 7,970,446 B2* | 6/2011 | Witkowski et al. | 455/575.9 |
| 8,194,133 B2* | 6/2012 | DeWind et al. | 348/148 |
| 2002/0197955 A1* | 12/2002 | Witkowski et al. | 455/41 |
| 2003/0001734 A1 | 1/2003 | Schofield et al. | |
| 2003/0020603 A1 | 1/2003 | DeLine et al. | |
| 2003/0102688 A1 | 6/2003 | Bingle et al. | |
| 2003/0117728 A1 | 6/2003 | Hutzel et al. | |
| 2003/0191583 A1 | 10/2003 | Uhlmann et al. | |
| 2004/0145457 A1 | 7/2004 | Schofield et al. | |
| 2004/0160313 A1 | 8/2004 | McCarthy et al. | |
| 2004/0165293 A1 | 8/2004 | Whitehead | |
| 2004/0203379 A1* | 10/2004 | Witkowski et al. | 455/41.2 |
| 2004/0209655 A1 | 10/2004 | Kubo | |
| 2005/0023858 A1 | 2/2005 | Bingle et al. | |
| 2005/0032550 A1 | 2/2005 | Baratono et al. | |
| 2005/0040941 A1 | 2/2005 | Schofield et al. | |
| 2005/0156714 A1 | 7/2005 | McCarthy et al. | |
| 2005/0156753 A1 | 7/2005 | DeLine et al. | |
| 2006/0035590 A1 | 2/2006 | Morris et al. | |
| 2006/0220817 A1 | 10/2006 | Schofield et al. | |
| 2006/0261932 A1 | 11/2006 | Ando et al. | |
| 2006/0290518 A1 | 12/2006 | Bingle et al. | |
| 2007/0002477 A1 | 1/2007 | Whitehead | |
| 2007/0058821 A1 | 3/2007 | Welsh et al. | |
| 2007/0109807 A1 | 5/2007 | Lynam et al. | |
| 2007/0118280 A1 | 5/2007 | Uhlmann et al. | |
| 2007/0132567 A1 | 6/2007 | Schofield et al. | |
| 2007/0171037 A1 | 7/2007 | Schofield et al. | |
| 2008/0045274 A1* | 2/2008 | Witkowski et al. | 455/569.2 |
| 2008/0080076 A1 | 4/2008 | Hutzel et al. | |
| 2008/0174414 A1 | 7/2008 | McCarthy et al. | |
| 2008/0186724 A1 | 8/2008 | Lynam et al. | |
| 2008/0212215 A1 | 9/2008 | Schofield et al. | |
| 2008/0225538 A1 | 9/2008 | Lynam et al. | |
| 2008/0266389 A1* | 10/2008 | DeWind et al. | 348/115 |
| 2008/0300779 A1 | 12/2008 | Uhlmann et al. | |
| 2009/0005136 A1 | 1/2009 | Hutzel et al. | |
| 2009/0097674 A1 | 4/2009 | Watson et al. | |
| 2009/0134606 A1 | 5/2009 | Schofield et al. | |
| 2009/0208058 A1 | 8/2009 | Schofield et al. | |
| 2009/0232328 A1 | 9/2009 | DeLine et al. | |
| 2009/0284391 A1 | 11/2009 | Berkobin et al. | |
| 2009/0290369 A1 | 11/2009 | Schofield et al. | |
| 2009/0318084 A1 | 12/2009 | McCarthy et al. | |
| 2010/0045790 A1 | 2/2010 | Lynam et al. | |
| 2010/0045797 A1 | 2/2010 | Schofield et al. | |
| 2010/0188508 A1 | 7/2010 | McMahon et al. | |
| 2011/0227698 A1* | 9/2011 | Witkowski et al. | 340/5.71 |
| 2012/0005395 A1 | 1/2012 | Lydon et al. | |
| 2012/0236152 A1* | 9/2012 | De Wind et al. | 348/148 |

OTHER PUBLICATIONS

USPTO, U.S. "Non-Final Office Action" mailed May 4, 2012 for U.S. Appl. No. 12/845,822, filed Jul. 29, 2010.

Owens, K.W., et al. "Telematics Unit and Method for Controlling Telematics Unit for a Vehicle," U.S. Appl. No. 12/845,822, filed Jul. 29, 2010.

Owens, K.W., et al. "Aftermarket Telematics System," U.S. Appl. No. 12/895,066, filed Sep. 30, 2010.

Peariso, N. J., et al. "Aftermarket Telematics Unit and Method for Installation Verification," U.S. Appl. No. 12/899,808, filed Oct. 7, 2010.

USPTO, U.S. "Notice of Allowance" mailed Sep. 19, 2012 for U.S. Appl. No. 12/845,822, filed Jul. 29, 2010.

USPTO, U.S. "Non-Final Office Action" mailed Nov. 14, 2012 for U.S. Appl. No. 12/851,025, filed Aug. 5, 2010.

USPTO, U.S. Non-Final Office Action mailed Jan. 18, 2013 for U.S. Appl. No. 12/895,066, filed Sep. 30, 2010.

German Patent & Trademark Office. German Office Action dated Nov. 20, 2012 for Application No. 10 2011 106 073.5.

* cited by examiner

AFTERMARKET TELEMATICS UNIT FOR USE WITH A VEHICLE

TECHNICAL FIELD

The technical field generally relates to vehicles, and more particularly relates to an aftermarket telematics unit for use with a vehicle.

BACKGROUND

Telematics services are those services that are provided by a call center to a vehicle and/or to the operator of a vehicle via an automatic and/or on-demand communications link connecting the call center to the vehicle. Some of the more common telematics services include, but are not limited to, turn-by-turn navigation guidance, assistance during times of emergency, cellular telephone services, and the remote monitoring of a vehicle's maintenance requirements. The use of telematics services by vehicle operators has grown steadily since such services first became available.

A vehicle that is capable of providing its driver with such telematics services typically includes an embedded telematics unit that is configured to communicate with a remotely located call center. The remotely located call center is configured, equipped and staffed to provide the above services (and others) to a vehicle operator through communications with the vehicle's embedded telematics unit.

The call center can also provide several services that are actuated by the vehicle's body control module (hereinafter "BCM"). Such BCM-related services include unlocking a vehicle's doors, flashing the vehicle's lights, honking the vehicle's horn, remotely starting the vehicle, and opening the vehicle's trunk. To provide these BCM-related services, the call center instructs the telematics unit to deliver appropriate commands to the BCM. The telematics unit is typically connected to the BCM over a vehicle bus and uses the vehicle bus to transmit these commands. The BCM, which is configured to control the various components on the vehicle that perform each of these additional services (i.e., the vehicle's horn, headlights, door lock motor, etc.), will actuate the appropriate component when the commands are received from the telematics unit. In this manner, a vehicle owner who, for example, has locked their keys inside of the vehicle, can place a phone call to the call center and have the vehicle's doors unlocked by the call center.

Because of the popularity of the above described telematics services, aftermarket telematics units are beginning to enter the market place. Such aftermarket telematics units make it possible for drivers of vehicles that lack an embedded telematics unit to, nevertheless, receive some of the above described telematics services. However, such aftermarket telematics units lack a connection to the vehicle bus which, as described above, is used to deliver commands to the BCM. Hence, aftermarket telematics units may not be enabled to communicate with the BCM and therefore may not be able to provide the BCM-related services described above (i.e., unlocking the vehicle's doors, etc. . . . ). These BCM-related services, however, are highly desirable among vehicle operators.

One possible solution would be to create a connection between the aftermarket telematics unit and the vehicle bus. These solutions, however, may be costly, complicated, or both.

SUMMARY

An aftermarket telematics unit for use with a vehicle is disclosed herein.

In an example, the aftermarket telematics unit includes, but is not limited to, a housing that is configured for mounting in an interior of a vehicle. A receiver is mounted within the housing and is configured to receive a first short range wireless signal at a first frequency. A fob component is mounted within the housing and is configured to transmit a second short range wireless signal at a second frequency. A controller is mounted within the housing and is coupled to the wireless receiver and the fob component. The controller is configured to provide an instruction to the fob component to transmit the second short range wireless signal when the wireless receiver receives the first short range wireless signal.

In another example, the aftermarket telematics unit includes, but is not limited to, a housing that is configured for mounting in an interior of a vehicle. A receiver is mounted within the housing and is configured to receive a first short range wireless signal at a first frequency. A fob component is mounted within the housing. The fob component is configured to store a rolling code, to transmit a second short range wireless signal at a second frequency, the second short range wireless signal including a code segment of the rolling code, and to advance to a next code segment of the rolling code after transmitting the second short range wireless signal. A controller is mounted within the housing and is coupled to the wireless receiver and the fob component. The controller is configured to provide an instruction to the fob component to transmit the second short range wireless signal when the wireless receiver receives the first short range wireless signal.

In yet another example, the aftermarket telematics unit includes, but is not limited to, a housing that is configured for mounting in an interior of a vehicle. A receiver is mounted within the housing and is configured to receive a first short range wireless signal at a first frequency. A fob component is mounted within the housing. The fob component is configured to store a rolling code, to transmit a second short range wireless signal at a second frequency, the second short range wireless signal including a code segment of the rolling code, to advance to a next code segment of the rolling code after transmitting the second short range wireless signal, to receive the second short range wireless signal from a key fob associated with the vehicle, and to advance to the next code segment of the rolling code after receiving the second short range wireless signal from a key fob associated with the vehicle. A controller is mounted within the housing and is coupled to the wireless receiver and the fob component. The controller is configured to provide an instruction to the fob component to transmit the second short range wireless signal when the wireless receiver receives the first short range wireless signal.

DESCRIPTION OF THE DRAWINGS

One or more examples will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

An aftermarket telematics unit for use with a vehicle is disclosed herein. The aftermarket telematics unit includes a key fob circuitry component (hereinafter, "fob component") that, in many respects, replicates a vehicle key fob. The fob component may be configured to perform all of the functions that a standard issue key fob may perform. The aftermarket telematics unit may be configured to receive instructions from a portable device operated by a user of the vehicle. The instructions will cause the aftermarket telematics unit to actuate the fob component, thus causing the doors to unlock, the horn to honk, etc., as directed by the user. In other examples, such instructions may be delivered to the aftermarket telematics unit via the call center.

A greater understanding of the examples of the systems disclosed herein may be obtained through a review of the illustrations accompanying this application together with a review of the detailed description that follows.

Figure 1:
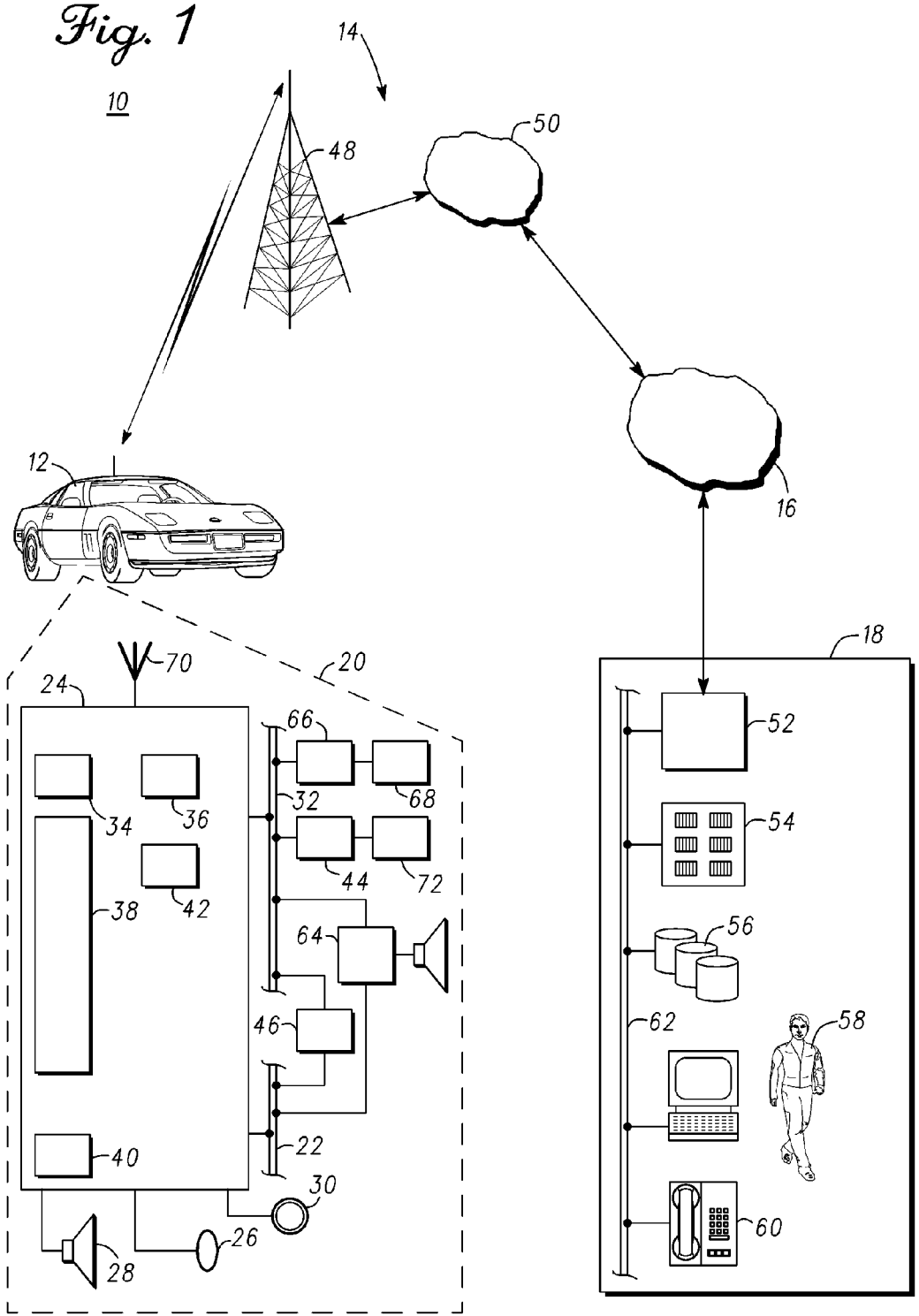
FIG. 1 is a schematic view illustrating a non-limiting example of a communication system suitable for use with examples of an aftermarket telematics unit made in accordance with the teachings disclosed herein.

With reference to FIG. 1, there is shown a non-limiting example of a communication system 10 that may be used together with examples of the aftermarket telematics unit disclosed herein. The communication system generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the apparatus disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over communication system 10. Some of the vehicle hardware 20 is shown generally in FIG. 1, including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within processing device 38.

The telematics unit 24 may provide various services including: turn-by-turn directions and other navigation-related services provided in conjunction with the GPS chipset/component 42; airbag deployment notification and other emergency or roadside assistance-related services provided in connection with various crash and/or collision sensor interface modules 66 and collision sensors 68 located throughout the vehicle; and/or infotainment-related services where music, Internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. In order to enable successful data transmission over the voice channel, wireless modem 36 applies some type of encoding or modulation to convert the digital data so that it can be communicated through a vocoder or speech codec incorporated in the cellular chipset/component 34. Any suitable encoding or modulation technique that provides an acceptable data rate and bit error can be used with the present examples. Dual mode antenna 70 services the GPS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14. For example, a base station and a cell tower could be co-located at the same site or they could be remotely located, and a single base station could be coupled to various cell towers or various base stations could be coupled with a single MSC, to list but a few of the possible arrangements. A speech codec or vocoder may be incorporated in one or more of the base stations, but depending on the particular architecture of the wireless network, it could be incorporated within a Mobile Switching Center or some other network components as well.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either the live advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a manned call center 18, it will be appreciated that the call center 18 can be any central or remote facility, manned or unmanned, mobile or fixed, to or from which it is desirable to exchange voice and data.

Figure 2:
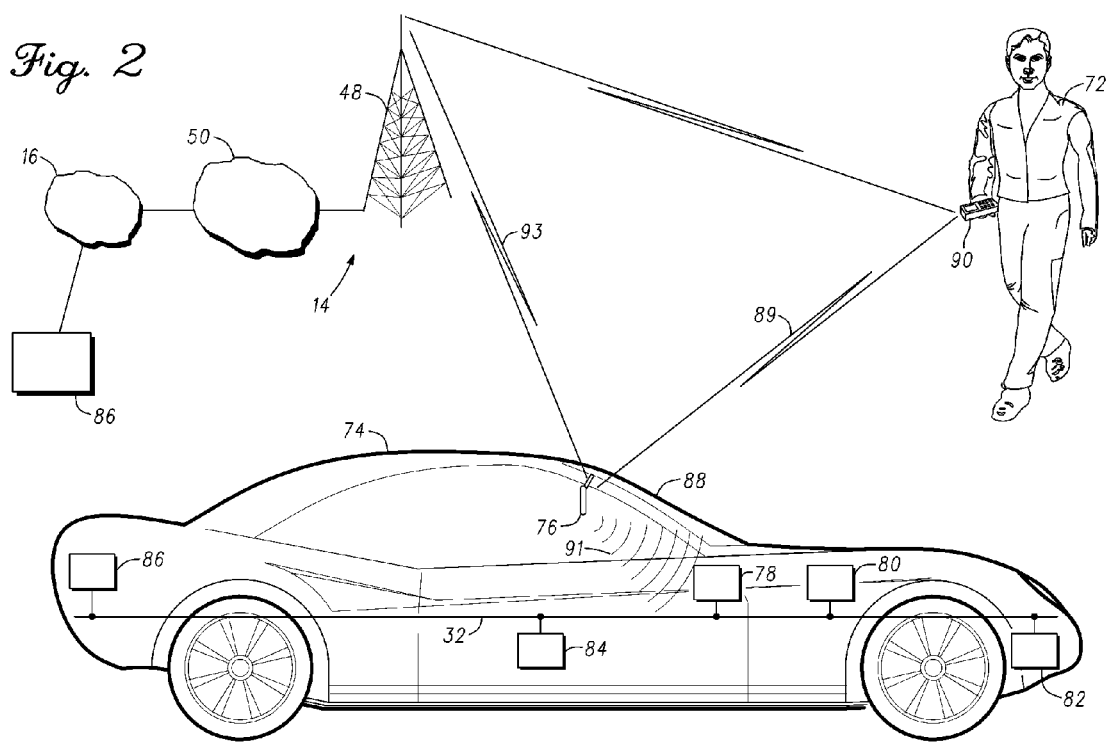
FIG. 2 is a schematic view illustrating a vehicle equipped with an example of the aftermarket telematics unit disclosed herein.

FIG. 2 is a schematic view illustrating a vehicle 74 equipped with an example of an aftermarket telematics unit 76. Although vehicle 74 lacks an embedded telematics unit, it should be understood that aftermarket telematics unit 76 may, nevertheless, be used together with a vehicle such as vehicle 12 (see FIG. 1) that includes such an embedded telematics unit.

In the illustrated example, aftermarket telematics unit 76 is configured as a rear view mirror that is mounted to an interior surface of windshield 88. It should be understood that aftermarket telematics unit 76 need not be configured as a rear view mirror, but rather, in other examples, may take any suitable or convenient form.

Vehicle 74 includes vehicle bus 32 which serves to connect various controllers and systems onboard vehicle 74. For example, a body control module 78 ("BCM 78") is connected to vehicle bus 32, as is horn 80, headlights 82, door lock motor 84, and power trunk release 86. BCM 78 is configured to control the operation of horn 80, headlights 82, door lock motor 84 and power trunk release 86 and may operate any/all of these systems by transmitting commands to such systems over vehicle bus 32. In other examples, rather than use vehicle bus 32, BCM 78 may have a direct wired or wireless connection to these components.

BCM 78 is also configured to receive, and to respond to, wireless transmissions emitted by a key fob (not shown). For example, BCM 78 may include an antenna and a receiver to directly receive wireless transmissions from a key fob. In other examples, vehicle 74 may include an antenna and a receiver that is configured to receive such transmissions and provide such transmissions to BCM 78. Using the key fob, a user may remotely actuate various systems on the vehicle such as horn 80, headlights 82, door lock motor 84, and power trunk release 86, among other features, by wirelessly transmitting instructions to BCM 78. In response to receiving such wireless instructions, BCM 78 transmits commands to the appropriate on board system over vehicle bus 32 to actuate the desired vehicle system.

As discussed in detail below, aftermarket telematics unit 76 includes a receiver (not shown in FIG. 2) which is configured to receive a wireless communication 89 from a portable device 90 (e.g., a smart phone) operated by a user 92. Portable device 90 may be loaded with, and may be configured to run, one or more software applications that permit user 92 to transmit commands/instructions to aftermarket telematics unit 76 by embedding such commands/instructions within wireless communication 89. Such commands/instructions may include commands to honk horn 80, to flash headlights 82, to lock or unlock the doors of vehicle 74, and to unlock the trunk lid of vehicle 74.

As is also discussed below in detail, aftermarket telematics unit 76 includes a fob component (not shown in FIG. 2) that is configured to wirelessly transmit a fob signal 91 to BCM 78 at the same frequency as, and in the same format as, the key fob that is sold with, and that is coupled to, vehicle 74. The same commands/instructions that are embedded in wireless communication 89 are also embedded into fob signal 91. Accordingly, when aftermarket telematics unit 76 receives wireless communication 89 including a command/instruction, aftermarket telematics unit transmits fob signal 91 containing the same command/instruction to BCM 78 and BCM 78 responds in the same manner that it would respond had fob signal 91 originated from a key fob.

In some examples, aftermarket telematics unit 76 may also include a cellular chipset component that is configured to enable aftermarket telematics unit 76 to communicate with call center 18 (see FIG. 1). In such examples, user 92 may be able to place a telephone call to call center 18 and obtain assistance from an advisor 58 (see FIG. 1). Advisor 58 may then initiate communications with aftermarket telematics unit 76 via land network 16 and wireless carrier system 14 and transmit instructions to aftermarket telematics unit 76 via cellular transmission 93. Upon receipt of cellular transmission 93, aftermarket telematics unit 76 may transmit fob signal 91 to BCM 78 in the same manner described above.

Figure 3:
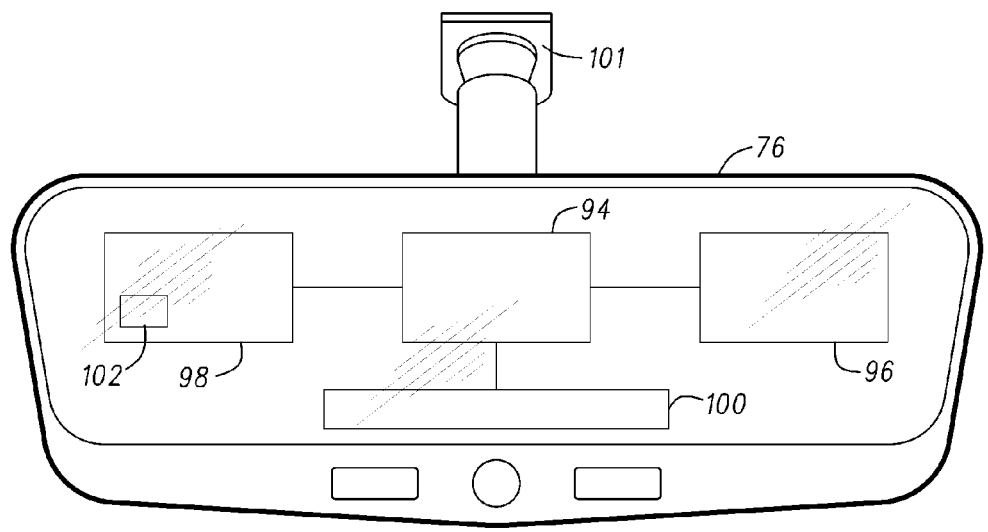
FIG. 3 is a schematic view illustrating an example of the aftermarket telematics unit disclosed herein.

FIG. 3 is a schematic view illustrating an example of aftermarket telematics unit 76. With continuing reference to FIGS. 1 and 2, in this example, aftermarket telematics unit 76 includes a controller 94, a transceiver 96, a fob component 98, and a cellular chipset component 100. In other examples, additional components, such as, but not limited to, a microphone, may be present. In still other examples, fewer components than those discussed above may be included. For example, other examples may not include cellular chipset component 100.

Aftermarket telematics unit 76 may be adhered to windshield 88 (see FIG. 2) by applying an adhesive to an underside of base 101 and then pressing the underside of base 101 to an interior surface of windshield 88. Alternate methods of attachment may also be implemented.

With continuing reference to FIG. 2, transceiver 96 may be any type of wireless communications receiver and is configured to transmit and receive wireless communication 89 at a first frequency from portable device 90. In one non-limiting example, transceiver 96 may be a short range wireless network transceiver such as a Bluetooth device. In other examples, transceiver 96 may be configured to transmit and receive any type of RF transmissions. Transceiver 96 may include an integrated antenna to detect, receive, and transmit wireless communications such as wireless communication 89 and may include associated electronics to process the received and transmitted signals. In some examples, transceiver 96 may be configured to automatically provide any and all received signals to controller 94 upon reception. In other examples, transceiver 96 may be configured to store received signals until such time as controller 94 retrieves them. In other examples, a separate receiver and transmitter may be employed, while in still other examples, only a receiver may be employed.

Fob component 98 includes circuitry that substantially replicates a standard key fob that is coupled to vehicle 74. Fob component 98 includes a fob transmitter 102 that is configured to wirelessly transmit RF signals at a second frequency that is utilized by a transmitter that is included in the standard key fob that is associated with vehicle 74. Fob component 98 is configured to perform standard key fob functions. Such standard functions include transmitting signals which, when received by BCM 78, will cause BCM 78 to unlock the vehicle's doors, open the vehicle's trunk, flash the vehicle's lights and honk the vehicles horn. In other examples, fob component 98 may also transmit signals that cause BCM 78 to activate and deactivate an alarm system and to start and stop vehicle 74's engine. In this manner, the inclusion of fob component 98 in aftermarket telematics unit 76 is the functional equivalent of mounting a vehicle key fob inside of vehicle 74.

Cellular chipset component 100 may be any combination of wireless transmitter, wireless receiver, and circuitry that permits cellular chipset component 100 to engage in cellular telephonic communications. Such communications may permit the transmission of voice communications, data communications, or both between vehicle 74 and call center 18.

Controller 94 may be any type of computer, computer system, or microprocessor that is configured to perform algorithms, to execute software applications, to execute sub-routines and/or to be loaded with and to execute any other type of computer program. Controller 94 may comprise a single processor or a plurality of processors acting in concert. Controller 94 is coupled to transceiver 96, to cellular chipset component 100 and to fob component 98. In some examples, such coupling may be via wires that are configured to carry signals while in other examples, such coupling may be wireless. Controller 94 is configured to receive communications from transceiver 96 and/or from cellular chipset component 100 and to provide instructions to fob component 98 related to such communications in order to effectuate a command from user 92.

Configured in the manner described above, a user may utilize aftermarket telematics unit 76 to obtain telematics services that involve activity by BCM 78. For example, if user 92 locked their keys inside of vehicle 74, user 92 could use portable device 90 to gain access to vehicle 74. User 92 could accomplish this by either directly transmitting an unlock instruction to aftermarket telematics unit 76 using portable device 90 or by using portable device 90 to contact call center 18 and requesting assistance. In the first case, wireless communication 89 will contain an instruction to unlock the doors of vehicle 74. This instruction would be received by transceiver 96 and transmitted to controller 94. In the second case, cellular transmission 93, originating from call center 18, will contain an instruction to unlock the doors of vehicle 74. This instruction will be received by cellular chipset component 100 and transmitted to controller 94.

Upon receipts of the instruction to unlock the doors, processor 94 would provide instructions to fob component 98 to transmit a door unlock command to BCM 78. Fob component 98 would then transmit fob signal 91 via fob transmitter 102 to BCM 78. Upon receipt of fob signal 91, BCM 78 would transmit an unlock command to door lock motor 84 via vehicle bus 32. Once this command is received by door lock motor 84, vehicle 74's door locks will unlock. Commands to perform other functions, such has honking horn 80, flashing headlights 82 and unlocking the trunk would be handled in a similar fashion.

Figure 4:
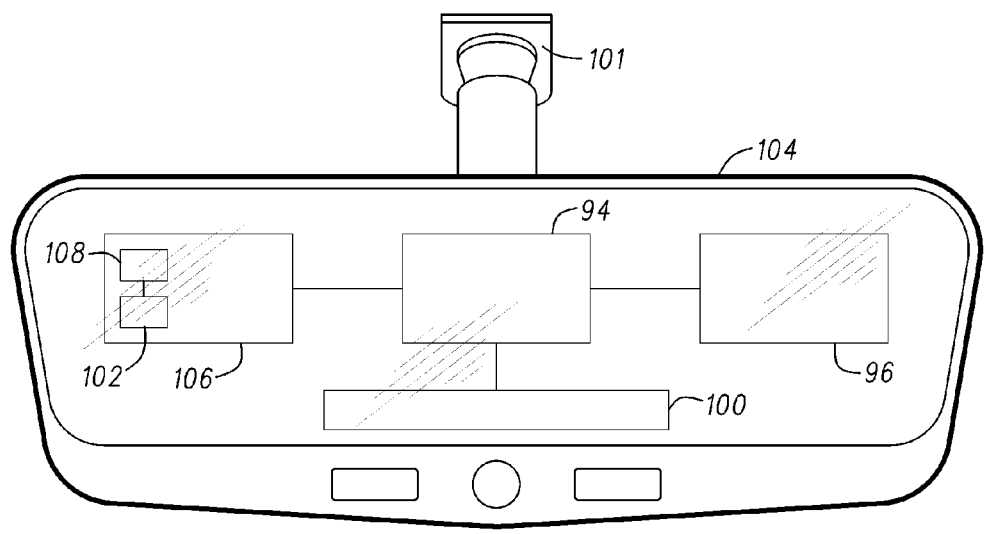
FIG. 4. is a schematic view illustrating another example of the aftermarket telematics unit disclosed herein.

FIG. 4. is a schematic view illustrating an aftermarket telematics unit 104. Aftermarket telematics unit 104 is configured for use with a vehicle such as vehicle 74 that employs a rolling code security system to electronically secure access to BCM 78 and to prevent any unauthorized activation of functions controlled by BCM 78.

As is well known in the art, a rolling code utilizes a pseudorandom number generator (PRNG) which is an algorithm for generating a sequence of numbers that approximates the properties of random numbers. The sequence is determined by a relatively small set of initial values, called the PRNG's state. If an improper or non-matching code is input, BCM 78 will not respond to the command. Whenever a code or code segment is input that does match the current code setting, BCM 78 will be actuated and the PRNG will select a new code or code segment that will be needed to activate BCM 78 the next time actuation is sought by a user. A standard key fob is configured to use the same PRNG and, when synchronized with vehicle 74, will advance to the same code or code segment as vehicle 74 so that it will be able to continuously actuate BCM 78.

Aftermarket telematics unit 104 is substantially identical to aftermarket telematics unit 76 of FIG. 3 and includes transceiver 96, cellular chipset component 100, and controller 94. Aftermarket telematics unit 104 further includes a fob component 106. Fob component 106 includes fob transmitter 102 and memory component 108 and is configured to implement the rolling code scheme discussed above. Memory component 108 may be any device configured to store and to permit the retrieval of data, including the initial values and the next code or code segment. When controller 94 instructs fob component 106 to transmit fob signal 91 to BCM 78, fob component 106 is configured to retrieve the current code from memory component 108, to include the current code in fob signal 91, to determine the next code or code segment, and to store the next code or code segment in memory component 108. This cycle repeats each time controller 94 sends a command to fob component 106 to transmit fob signal 91.

Figure 5:
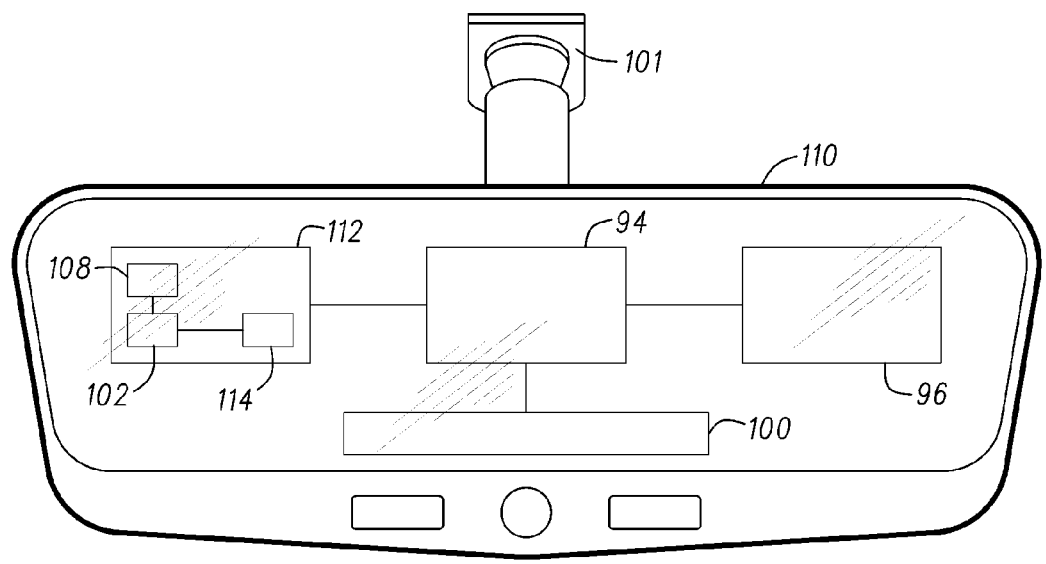
FIG. 5 is a schematic view illustrating yet another example of the aftermarket telematics unit disclosed herein.

FIG. 5 is a schematic view illustrating yet another example of an aftermarket telematics unit 110. Aftermarket telematics unit 110 is substantially identical to aftermarket telematics unit 104 of FIG. 4, and includes controller 94, transceiver 96, and cellular chipset component 100. Aftermarket telematics unit 110 also includes fob component 112 which is substantially identical to fob component 106 of FIG. 4 and includes fob transmitter 102 and memory component 108 which cooperate to enable fob component 112 to be compatible with a vehicle that employs the rolling code security system discussed above.

Fob component 112 further includes fob receiver 114. Fob receiver 114 is configured to receive wireless transmissions from a key fob that is synchronized with vehicle 74. Each time a transmission from the synchronized key fob is received by fob receiver 114, fob component 112 is configured to advance to the next code in the same manner that it would have had fob component 112 transmitted fob signal 91. In this manner, fob component 112 will remain synchronized with vehicle 74 despite repeated usage of the vehicle's key fob during periods between usages of fob component 112. In other examples, rather than including a separate transmitter and receiver, fob transmitter 102 and fob receiver 114 may be replaced by a single fob transceiver configured to both send and receive wireless fob transmissions.

While at least one exemplary example has been presented in the foregoing detailed description, it should be appreciated that a vast number of variations exist. It should also be appreciated that the exemplary example or examples are not intended to limit the scope, applicability, or configuration in any way. Rather, the foregoing detailed description will provide those skilled in the art with a convenient road map for implementing the exemplary example(s). It should be understood that various changes can be made in the function and arrangement of elements without departing from the scope as set forth in the appended claims and the legal equivalents thereof.

What is claimed is:

1. An aftermarket telematics unit for use with a vehicle, the aftermarket telematics unit comprising:
    a housing configured for mounting in an interior of the vehicle;
    a transceiver mounted within the housing and configured to receive a first short range wireless signal at a first frequency, the transceiver further configured to transmit at the first frequency;
    a fob component mounted within the housing and configured to transmit a second short range wireless signal at a second frequency; and
    a controller mounted within the housing and coupled to the transceiver and the fob component, the controller configured to provide an instruction to the fob component to transmit the second short range wireless signal when the transceiver receives the first short range wireless signal.

2. The aftermarket telematics unit of claim 1, wherein the transceiver comprises a Bluetooth transceiver.

3. The aftermarket telematics unit of claim 1, wherein the fob component is configured to transmit the second short range wireless signal to a body control module on the vehicle.

4. The aftermarket telematics unit of claim 3, wherein the second short range wireless signal comprises one of a command to unlock a door, a command to unlock a trunk, a command to activate an alarm, a command to flash lights and a command to honk a horn.

5. The aftermarket telematics unit of claim 1, wherein the housing comprises a mirror.

6. The aftermarket telematics unit of claim 1, further comprising a cellular telephonic transceiver coupled to the controller, wherein the controller is further configured to provide the instruction to the fob component to transmit the second short range wireless signal when the cellular telephonic transceiver receives a cellular telephone signal.

7. An aftermarket telematics unit for use with a vehicle, the aftermarket telematics unit comprising:
    a housing configured for mounting in an interior of the vehicle;
    a receiver mounted within the housing and configured to receive a first short range wireless signal at a first frequency;
    a fob component mounted within the housing and configured to store a rolling code, to transmit a second short range wireless signal at a second frequency, the second short range wireless signal including a code segment of the rolling code, and to advance to a next code segment of the rolling code after transmitting the second short range wireless signal; and
    a controller mounted within the housing and coupled to the receiver and the fob component, the controller configured to provide an instruction to the fob component to transmit the second short range wireless signal when the receiver receives the first short range wireless signal.

8. The aftermarket telematics unit of claim 7, wherein the receiver comprises a transceiver configured to transmit and receive at the first frequency.

9. The aftermarket telematics unit of claim 8, wherein the transceiver comprises a Bluetooth transceiver.

10. The aftermarket telematics unit of claim 9, wherein the fob component is configured to transmit the second short range wireless signal to a body control module on the vehicle.

11. The aftermarket telematics unit of claim 10, wherein the second short range wireless signal comprises one of a command to unlock a door, a command to unlock a trunk, a command to activate an alarm, a command to flash lights and a command to honk a horn.

12. The aftermarket telematics unit of claim 9, wherein the housing comprises a mirror.

13. The aftermarket telematics unit of claim 9, further comprising a cellular telephonic transceiver coupled to the controller, wherein the controller is further configured to provide the instruction to the fob component to transmit the second short range wireless signal when the cellular telephonic transceiver receives a cellular telephone signal.

14. An aftermarket telematics unit for use with a vehicle, the aftermarket telematics unit comprising:
    a housing configured for mounting in an interior of the vehicle;
    a receiver mounted within the housing and configured to receive a first short range wireless signal at a first frequency;

a fob component mounted within the housing and configured to store a rolling code, to transmit a second short range wireless signal at a second frequency, the second short range wireless signal including a code segment of the rolling code, to advance to a next code segment of the rolling code after transmitting the second short range wireless signal, to receive the second short range wireless signal from a key fob associated with the vehicle, and to advance to the next code segment of the rolling code after receiving the second short range wireless signal from the key fob associated with the vehicle; and a controller mounted within the housing and coupled to the receiver and the fob component, the controller configured to provide an instruction to the fob component to transmit the second short range wireless signal when the receiver receives the first short range wireless signal.

15. The aftermarket telematics unit of claim 14, wherein the receiver comprises a transceiver configured to transmit and receive at the first frequency.

16. The aftermarket telematics unit of claim 15, wherein the transceiver comprises a Bluetooth transceiver.

17. The aftermarket telematics unit of claim 14, wherein the fob component is configured to transmit the second short range wireless signal to a body control module on the vehicle.

18. The aftermarket telematics unit of claim 14, wherein the housing comprises a mirror.

19. The aftermarket telematics unit of claim 14, further comprising a cellular telephonic transceiver coupled to the controller, wherein the controller is further configured to provide the instruction to the fob component to transmit the second short range wireless signal when the cellular telephonic transceiver receives a cellular telephone signal.

* * * * *